US011156694B2

(12) United States Patent
Ivanov et al.

(10) Patent No.: US 11,156,694 B2
(45) Date of Patent: Oct. 26, 2021

(54) SUPPORTING A SELECTION OF A FLOOR

(71) Applicant: HERE Global B.V., Eindhoven (NL)

(72) Inventors: Pavel Ivanov, Tampere (FI); Lauri Aarne Johannes Wirola, Tampere (FI)

(73) Assignee: Here Global B.V., Eindhoven (NL)

(*) Notice: Subject to any disclaimer, the term of this patent is extended or adjusted under 35 U.S.C. 154(b) by 0 days.

(21) Appl. No.: 16/769,194

(22) PCT Filed: Dec. 8, 2017

(86) PCT No.: PCT/EP2017/081983
§ 371 (c)(1),
(2) Date: Jun. 2, 2020

(87) PCT Pub. No.: WO2019/110117
PCT Pub. Date: Jun. 13, 2019

(65) Prior Publication Data
US 2021/0173039 A1    Jun. 10, 2021

(51) Int. Cl.
*G01S 5/02*  (2010.01)
*G01C 21/20* (2006.01)
(Continued)

(52) U.S. Cl.
CPC ............ *G01S 5/02521* (2020.05); *G01C 5/06* (2013.01); *G01C 21/206* (2013.01); *H04W 64/00* (2013.01); *H04W 88/02* (2013.01)

(58) Field of Classification Search
CPC .... G01S 5/0252; G01S 5/02525; H04W 4/33; H04W 4/38; G01C 21/206; G06F 16/29
See application file for complete search history.

(56) References Cited

U.S. PATENT DOCUMENTS 6,434,485 B1 * 8/2002 Beason ............... G01C 5/06
                                                   342/120
8,538,442 B1 * 9/2013 Ettinger ............. H04W 40/244
                                                   455/446
(Continued)

FOREIGN PATENT DOCUMENTS

WO   WO 2015/188847 A1   12/2015
WO   WO 2015/197107 A1   12/2015
(Continued)

OTHER PUBLICATIONS

International Search Report and Written Opinion for Application No. PCT/EP2017/081983 dated Aug. 21, 2018, 15 pages.
(Continued)

*Primary Examiner* — Dung Hong
(74) *Attorney, Agent, or Firm* — Alston & Bird LLP (57) ABSTRACT

A mobile device collects data, which enables a generation of a radio map for a site. The collection comprises detecting at least one indication of a floor, at which a user is located, in a user input; and performing measurements on radio signals to obtain for each of a plurality of locations of the site a set of characteristics of radio signals. The mobile device receives, during the collection of data, data from a barometer, verifies a most recent indication of a floor in a user input based on changes in the data from the barometer, and outputs a warning to the user in the case of a discrepancy. The mobile device associates each set of characteristics with a floor indicated by a user. The mobile device provides the sets of characteristics and their association with a floor for a generation a radio map supporting a positioning at the site.

20 Claims, 3 Drawing Sheets

(51) Int. Cl.
*H04W 64/00* (2009.01)
*G01C 5/06* (2006.01)
*H04W 88/02* (2009.01)

(56) References Cited

U.S. PATENT DOCUMENTS

| | | | | |
|---|---|---|---|---|
| 10,393,518 B2* | 8/2019 | Yasui | G01C 21/206 |
| 10,794,986 B2* | 10/2020 | Bhatti | H04W 4/025 |
| 2004/0152470 A1* | 8/2004 | Spain | H04W 64/00 | 455/456.1 |
| 2009/0067392 A1* | 3/2009 | Hart | G01S 5/02 | 370/338 |
| 2009/0156230 A1* | 6/2009 | Versteeg | G01S 5/0252 | 455/456.1 |
| 2010/0026513 A1* | 2/2010 | Pandey | G08B 21/0247 | 340/8.1 |
| 2014/0129136 A1* | 5/2014 | Celia | G01C 21/16 | 701/445 |
| 2014/0141803 A1* | 5/2014 | Marti | G01S 5/0278 | 455/456.2 |
| 2014/0142846 A1* | 5/2014 | Chun | G01C 21/206 | 701/519 |
| 2014/0323163 A1* | 10/2014 | Venkatraman | H04W 64/00 | 455/457 |
| 2014/0324381 A1* | 10/2014 | Venkatraman | G01S 5/0257 | 702/138 |
| 2015/0006100 A1* | 1/2015 | Jackson | G01C 5/06 | 702/94 |
| 2016/0033266 A1* | 2/2016 | Le Grand | G01L 19/0092 | 702/150 |
| 2016/0161592 A1* | 6/2016 | Wirola | G01S 5/0252 | 702/150 |
| 2017/0045359 A9* | 2/2017 | Barfield | G01C 5/06 |
| 2017/0099584 A1* | 4/2017 | Bhanot | H04L 61/6022 |
| 2017/0332203 A1* | 11/2017 | Nagpal | G01C 21/165 |
| 2018/0255430 A1* | 9/2018 | Ivanov | H04B 17/318 |
| 2018/0367952 A1* | 12/2018 | Devdas | G08B 21/0446 |

FOREIGN PATENT DOCUMENTS

WO WO 2016/206717 A1 12/2016
WO WO-2016206717 A1 * 12/2016 ........... G01C 21/206

OTHER PUBLICATIONS

Burgess, S. et al., *Smartphone Positioning in Multi-Floor Environments Without Calibration or Added Infrastructure*, 2016 International Conference on Indoor Positioning and Indoor Navigation (IPIN) (Oct. 2016) 8 pages.

* cited by examiner

SUPPORTING A SELECTION OF A FLOOR

CROSS-REFERENCE TO RELATED APPLICATIONS

This application is a national phase entry of International Application No. PCT/EP2017/081983, filed Dec. 8, 2017, the entire contents of which are incorporated herein by reference.

FIELD OF THE DISCLOSURE

The invention relates to the field of positioning and more specifically to supporting a selection of a floor of a site during a collection of data for at least one radio map for the site.

BACKGROUND

Satellite signal based positioning technologies, which are mainly used outdoors, are usually not suited to deliver a satisfactory performance when used for indoor positioning, since satellite signals of global navigation satellite systems (GNSS), like the global positioning system (GPS), do not penetrate through walls and roofs strongly enough for an adequate signal reception indoors. Thus, these positioning technologies are not able to deliver a performance indoors that would enable seamless, equal and accurate navigation experience outdoors and indoors.

Therefore, several dedicated solutions for indoor positioning have been developed and commercially deployed during the past years. Examples comprise solutions that are based on pseudolites, which are ground based GPS-like short-range beacons, ultra-sound positioning solutions, Bluetooth™ based positioning solutions, Bluetooth low energy (BLE) based positioning solutions, cellular network based positioning solutions and wireless local area network (WLAN) based positioning solutions.

A WLAN based positioning solution, for instance, may be based on modeling the WLAN radio environment at a site as a radio map using results of measurements on radio signals at the site. The modelled radio map may then enable an accurate horizontal positioning within the coverage of the radio map and reliable floor detection.

In a first phase, which may be called radiomapping phase, samples containing a respective geolocation—e.g. in the form of latitude, longitude and altitude or of Cartesian coordinates x, y and floor number—and results of radio measurements at this location—e.g. detected WLAN access point identities and associated received signal strength (RSS) values—are collected.

The collected samples are used for creating the radio map for the site, which allows understanding how the radio signals behave at the site. That is, the radio map allows determining which radio signals may be expected at each location of the site.

In a second phase, which may be called positioning phase, the positions of mobile devices at the site may be determined using the created radio map. When a mobile device observes certain radio signals at a certain location of the site, the signal strengths of the radio signals can be compared to the radio map for the site, a best match resulting in the desired location information.

A similar approach could be used for a positioning that is based on other types of terrestrial radio transmitters or on a combination of different types of terrestrial radio transmitters.

The samples for the creation of a radio map may be collected in a continuous background process, in which mobile user devices of a large number of users are automatically reporting results of measurements along with associated information on the respective location of measurement to a server. This approach is also referred to as crowd-sourcing. In this approach, the required locations of measurements may be determined automatically as well, e.g. by means of a satellite signal based positioning or a cellular network based positioning. Alternatively or in addition, special survey personnel may be instructed to collect radio samples in a systematic manner, possibly using special tools. In this approach, the locations of measurements may be input manually. While automated crowd-sourcing may enable indoor localization in large number of buildings in a cost efficient manner, a systematic manual data collection may be the best option, when high accuracy is desired.

SUMMARY OF SOME EMBODIMENTS OF THE INVENTION

An example embodiment of a method comprises collecting data, which enables a generation of at least one radio map for a site, the collection of data comprising detecting at least one indication of a floor, at which a user is located at the site, in a user input to the mobile device; and performing measurements on radio signals to obtain for each of a plurality of locations of the site a set of characteristics of radio signals transmitted by terrestrial radio transmitters. The method further comprises receiving, during the collection of data, data from a barometer or pressure altimeter of the mobile device, verifying a most recent indication of a floor in a user input based on changes in the data from the barometer or pressure altimeter, and outputting a warning to the user in the case of a discrepancy. The method further comprises associating each set of characteristics with a floor, the floor being based on a most recent indication of a floor at a time when the respective set of characteristics has been obtained. The method further comprises providing the sets of characteristics and their association with a floor for a generation of at least one radio map supporting a positioning of mobile devices at the site. The method may be performed by a mobile device.

An example embodiment of a first apparatus comprises means for causing a mobile device to perform the actions of any embodiment of the presented method.

The means of the apparatus may be implemented in hardware and/or software. They may comprise for instance a processor for executing computer program code for realizing the required functions, a memory storing the program code, or both. Alternatively, they may comprise for instance circuitry that is designed to realize the required functions, for instance implemented in a chipset or a chip, like an integrated circuit.

An example embodiment of a second apparatus comprises at least one processor and at least one memory including computer program code, the at least one memory and the computer program code configured to, with the at least one processor, cause a mobile device at least to perform the actions of any embodiment of the presented method.

Any of the described apparatuses may comprise only the indicated components or one or more additional components, like a memory for a database. Any of the described apparatuses may be the mobile device that is caused to perform actions or form a part of the mobile device.

An example embodiment of a system comprises at least one of any of the presented embodiments of an apparatus and a server. The server is configured to receive sets of characteristics provided by the apparatus for a site and to cause a generation of at least one radio map for the site based on received sets of characteristics.

Moreover an example embodiment of a non-transitory computer readable storage medium, in which computer program code is stored, is presented. The computer program code causes a mobile device to perform the actions of any embodiment of the presented method when executed by at least one processor.

The computer readable storage medium may be for example a disk or a memory or the like. The computer program code may be stored in the computer readable storage medium in the form of instructions encoding the computer-readable storage medium. The computer readable storage medium may be intended for taking part in the operation of a device, like an internal program memory or like an integrated or exchangeable memory card, or it may be intended for distribution of the program code, like an optical disc or memory stick or memory card.

It is to be understood that any embodiment of the computer program code by itself has to be considered an example embodiment of the invention as well. The computer program code could also be distributed to several computer readable storage mediums.

In certain embodiments, any of the presented methods is an information providing method, and any of the presented first apparatuses is an information providing apparatus. In certain embodiments, the means of the presented first apparatus are processing means.

In certain embodiments, any of the presented methods is a method for supporting a selection of a floor. In certain embodiment, any of the presented systems is a system for supporting a selection of a floor.

It is to be understood that any feature presented for a particular example embodiment may also be used in combination with any other described example embodiment of any category and any aspect.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
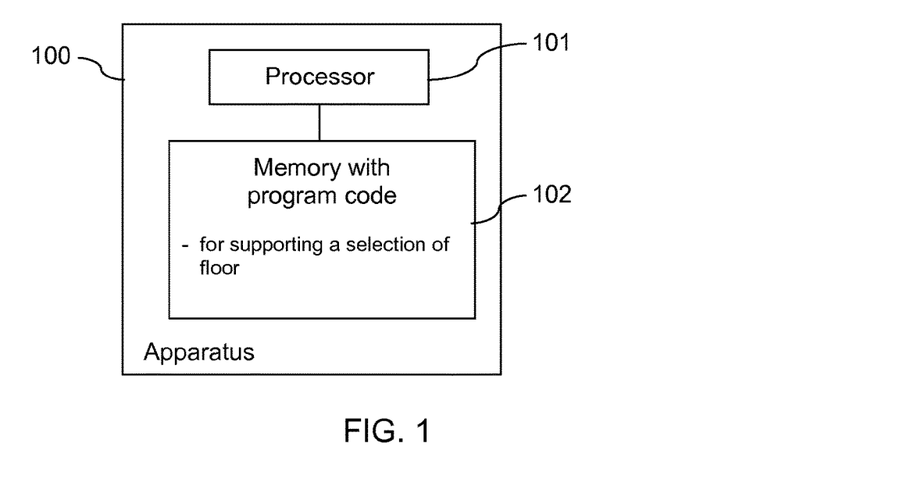
FIG. 1 is a schematic block diagram of an example embodiment of an apparatus.

FIG. 1 is a schematic block diagram of an example embodiment of an apparatus 100 according to the invention. Apparatus 100 comprises at least one processor 101 and, linked to the at least one processor 101, at least one memory 102. The at least one memory 102 stores computer program code for supporting a correct selection of a floor by a user. The computer program code may be example computer program code according to the invention, and the at least one memory 102 may be an example computer readable medium according to the invention. The at least one processor 101 is configured to execute computer program code stored in the at least one memory 102 in order to cause a mobile device to perform desired actions.

Apparatus 100 may be a mobile device, e.g. in the form of a regular mobile communication device supplemented with suitable computer program code, or a special survey tool. Apparatus 100 may equally be a module, like a chip, circuitry on a chip, for a mobile device. Optionally, apparatus 100 may comprise various other components, like radio communication interfaces, a user interface, a barometer or pressure altimeter, a further memory, a further processor, etc.

An example operation of apparatus 100 will now be described with reference to the flow chart of FIG. 2. The operation is an example embodiment of a method according to the invention. The at least one processor 101 and the program code stored in the at least one memory 102 cause a mobile device to perform the operation when program code is retrieved from the at least one memory 102 and executed by the at least one processor 101. The mobile device that is caused to perform the operation may be apparatus 100 or comprise apparatus 100.

The mobile device collects data, which enables a generation of at least one radio map for a site. The collection of data comprises detecting at least one indication of a floor, at which a user is located at the site, in a user input to the mobile device; and performing measurements on radio signals to obtain for each of a plurality of locations of the site a set of characteristics of radio signals transmitted by terrestrial radio transmitters. (action 201) The site may be any site with several floors. The user of the mobile device may be responsible for conducting a survey of the site. The user may be instructed to indicate a floor in a user input to the mobile device at least whenever there has been a change of floor after a preceding user input. The characteristics of radio signals of a radio transmitter may be of different kinds. They may comprise for instance received signal strengths of radio signals. A received signal strength may be represented for instance by a received signal strength indication (RSSI) or a physical Rx level in dBm with a reference value of 1 mW, etc. Alternatively, the characteristics of radio signals may comprise for example path losses of radio signals. A set of characteristics may comprise characteristics of radio signals of all considered radio transmitters from which radio signals may be detected at a particular location.

The mobile device receives, during the collection of data, data from a barometer or pressure altimeter of the mobile device, verifies a most recent indication of a floor in a user input based on changes in the data from the barometer or pressure altimeter, and outputs a warning to the user in the case of a discrepancy. (action 202) A pressure altimeter may include a barometer and convert atmospheric pressure values provided by the barometer into altitude values and output such altitude values. The altitude values may or may not be calibrated based on a reference altitude.

The mobile device associates each set of characteristics with a floor. The floor is based on a most recent indication of a floor at a time when the respective set of characteristics has been obtained. (action 203) Depending on the implementation, this action may only be performed, in case the user reacted to a preceding warning, if any. It is to be understood that sets of characteristics may be obtained for more locations than the indicated plurality of locations, so that there may be sets of characteristics that are not associated with a floor by the mobile device.

The mobile device provides the sets of characteristics and their association with a floor for a generation of at least one radio map supporting a positioning of mobile devices at the site. (action 204)

The invention is based on the consideration that a systematic collection of data by surveying persons may be the best option when radio maps of high accuracy are to be generated based on the collected data. They may walk around sites with mobile devices that are configured to collect the required data, and provide an update of their location after each covered segment, for example. To begin with, a surveying person needs to manually select the floor on each floor on which a survey is to be carried out. This may be less trivial than may be expected, e.g. in office buildings, where floors may resemble each other. Experience shows that surveying persons make quite many mistakes when selecting the floor.

According to certain embodiments of the invention, data provided by a barometer is therefore used throughout a collection of data on radio signals to detect changes in atmospheric pressure. Even without external reference, the atmospheric pressure data provided by a barometer is suited to represent changes in altitude; therefore barometer-based pressure or altitude information can readily be used to detect, whether a user of a mobile device comprising the barometer moves upwards or downwards and by how much. Detected changes in atmospheric pressure (or derived changes in altitude) may thus be correlated with an input by a user indicating the respective floor on which data on radio signals is currently to be collected. If there is a discrepancy, a warning may be output.

Certain embodiments of the invention may have the effect that they allow providing an early warning to the user about a possible mistake in selecting a floor. As barometers are widely available in mobile devices, it is moreover a solution that minimizes the increase in complexity and costs. As only changes in barometer data or pressure altimeter data are considered, calibrations of the mobile device with absolute altitude values are not required.

Figure 2:
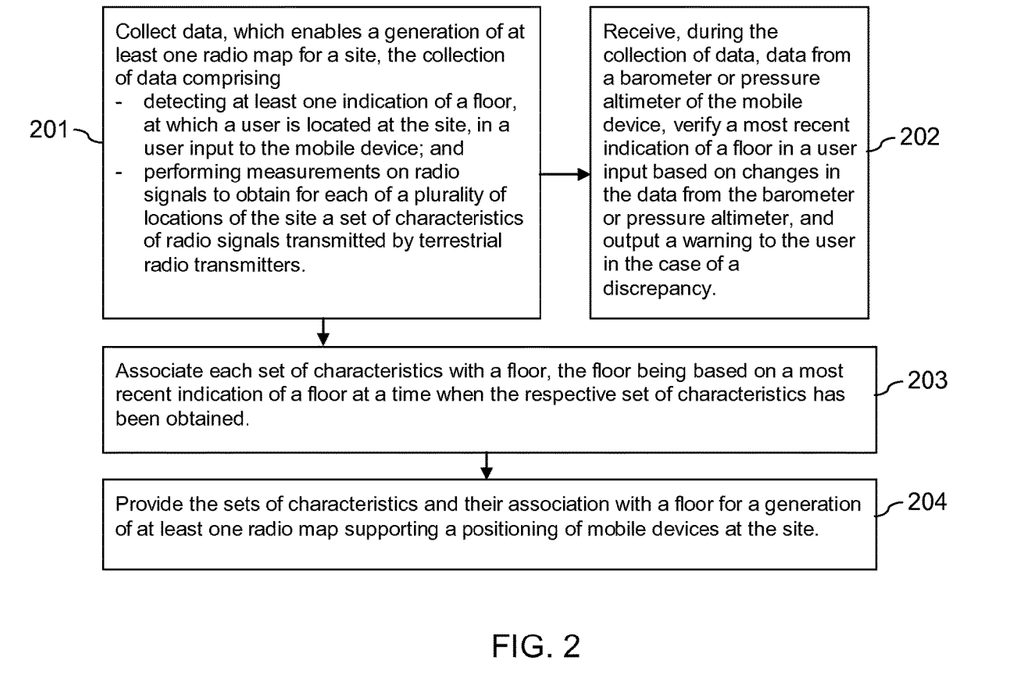
FIG. 2 is a flow chart illustrating an example embodiment of a method.

Apparatus 100 illustrated in FIG. 1 and the method illustrated in FIG. 2 may be implemented and refined in various ways.

Certain embodiments further comprise detecting at each of the plurality of locations an indication of a position in a user input to the mobile device; associating in addition a position with each set of characteristics, the position being based on the indication of the position at the location for which the respective set of characteristics has been obtained; and providing the sets of characteristics with respectively associated floor and position for a generation of at least one radio map supporting a positioning of mobile devices at the site. A position indicated by a user may be a two-dimensional position. A position indicated by a user may defines a location of measurement in a plane, e.g. on a floor. The position may be indicated for instance by a user as a spot in a floor-map presented on a display of the mobile device. The indication of a floor by the user may define a third dimension of a location of measurement. These embodiments may have the effect that a determination of the locations of measurement can be based completely on user inputs. As a result it is not required, for example, to rely on satellite signals for determination of the locations of measurements, which may not be received with sufficient strength inside of buildings, nor on signals of cellular communication networks, which may equally not be received with sufficient strength inside of buildings and which may moreover result in positions of limited accuracy.

In certain embodiments, a change in barometer data or pressure altimeter data is considered to reflect a change of floor if and only if the change is of a predetermined amount during a predetermined time. It is to be understood that amount and/or time may each be defined by at least one range and/or by at least one predetermined limit. Furthermore, there may be a single predetermined amount and a single predetermined time, which allows computing corresponding amounts and times for any number of floors; or there may be a separate predetermined amount and a separate predetermined time for each possible number of floors. It is to be understood that optionally, the predetermined amount and/or the predetermined time may be set individually for each site or for selected sites based on a known height of floors at the site.

During a floor change, atmospheric pressure changes quite rapidly with respect to time. Atmospheric pressure changes by 12 pascal (Pa) per meter so that the change rate is several Pa per second during an ascent or descent to change floors. Taking account of the rate of change of atmospheric pressure may thus allow distinguishing between a change of atmospheric pressure resulting from a change of floor and a change of atmospheric pressure resulting from some other factor that may result in a change in atmospheric pressure, like a weather front, which causes a much slower change in atmospheric pressure.

Changes in the data from a barometer may also be converted into altitude changes separately from a dedicated pressure altimeter. Furthermore, changes in pressure altimeter data may be converted into adjusted altitude changes. In both cases, slow changes in altitude may be filtered out in the conversion.

In certain embodiments, a change in barometer data or pressure altimeter data may thus be considered to reflect a change of altitude, if and only if the change in barometer data or pressure altimeter data is of a predetermined amount during a predetermined time, wherein the change of altitude is used to verify the most recent indication of a floor in a user input. In other words, the altitude is only considered to have changed, if the speed of a pressure change exceeds predetermined ranges or limits. Mapping a pressure change to an altitude change and then the altitude change to a floor change may be more robust than mapping a pressure change directly to a floor change. It is to be understood that the above comments on predetermined amount and predetermined time apply for these embodiments as well.

In certain embodiments, information on a change of barometer data or pressure altimeter data during a time interval between the two latest user inputs is used for the verification of the most recent indication of a floor. The two latest user inputs do not necessarily have to comprise an indication of a floor. One or both of them could only indicate a position of measurement, which means that a previously indicated floor should still be valid. Such embodiments may take account of several constellations resulting from mistakes by the user. For example, there may have been no change of floor indicated by the user, but the change of barometer data or pressure altimeter data suggests that a change of floor has taken place. For example, the user may have indicated a change of floor, but a lack of change of barometer data or pressure altimeter data suggests that no change of floor has taken place. For example, the user may have indicated a change of floor, but the change of barometer data or pressure altimeter data suggests that a change of floor has taken place in another direction or by more or fewer floors than indicated.

In certain variations, a cumulative altitude change, which is determined based on changes in barometer data or pressure altimeter data during a time interval between the two latest user inputs is used for the verification of the most recent indication of a floor.

Certain embodiments further comprise, in the case a warning is output to the user, requesting a user to confirm the indicated floor or to input a corrected floor and/or suspending an association of a floor with sets of characteristics until a new user input indicating a new floor or confirming the previously indicated floor is detected. This may have the effect that it is ensured that measurement results are not associated with a wrong floor.

In certain embodiments, the data received from a barometer comprises information on atmospheric pressure. In this case, the mobile device may, for example, track absolute values of atmospheric pressure to determine changes in atmospheric pressure. The mobile device may then perform a direct mapping of changes in pressure to expected changes in floors; or changes in pressure into expected changes in altitude and compare the changes in altitude to expected changes in floors. Alternatively, absolute values of atmospheric pressure may be converted into altitude values and changes in altitude may be determined based on these altitude values and then mapped to changes in floors. The conversion of absolute values of atmospheric pressure into altitude values may be based for instance on an output of a separate pressure altimeter application taking care of the conversion, which may optionally be provided in the mobile device for some other function. Alternatively or in addition, the barometer may be a part of a pressure altimeter module. In this case, the received data of the pressure altimeter may comprise information on altitude that is determined based on atmospheric pressure. The mobile device may then track the altitude and perform a mapping of changes in altitude to expected changes in floors.

Certain embodiments further take account of the following for the verification: a known floor height at the site or a floor height within a predetermined range. A known floor height may be provided to mobile device for instance along with a site map for the site. A known floor height may indicate for instance the altitude difference between the floors or the height of the ceilings of the floors. Using a known floor height may result in a particularly reliable verification. Taking account of different known floor heights for different floors of a single site may optionally be supported as well. A predetermined range may be for instance 3-4 meters or any other default range. Enabling the use of a predetermined range may have the effect that the presented approach may be used as well if a known floor height is not available. It is to be understood that the mobile device may support only one or both of the alternatives.

In certain embodiments, the radio transmitters comprise WLAN access points and/or Bluetooth beacons and/or BLE beacons. WLAN access points and Bluetooth beacons are already installed in many buildings. Furthermore, WLAN and Bluetooth technologies are supported by many mobile user devices by default, like by most smartphones, tablets, laptops and feature phones. Evaluating the received signal strength of signals transmitted by WLAN access points, Bluetooth beacons and/or BLE beacons may thus have the effect that the determined reference locations may be based in some embodiments on an existing infrastructure in buildings and/or be exploited with existing capabilities in many mobile devices. As a result, the approach may be globally scalable and have low maintenance and deployment costs. The deployment of new infrastructure, including for example beacons and tags, is possible but not necessary. In addition, the end-user experience may be acceptable with these technologies, since a horizontal positioning accuracy of 2-3 meters as well as close to 100% reliability in floor detection may be achieved. The radio transmitters may be stand-alone devices or be integrated into or attached to some other device. The use of Bluetooth low energy may limit the energy consumption at all involved devices. A Bluetooth beacon that is employed for the invention may be any kind of Bluetooth beacon complying with any present or future standard.

It is to be understood, however, that other types of radio transmitters than variations of WLAN access points or Bluetooth beacons may be used as well, for instance tags or other devices that are configured to transmit ultra-wideband (UWB) signals or ultra-sound signals or any wireless signals that might emerge in the future. If the radio transmitters comprises alternatively or in addition a cellular transmitter, any of the radio transmitters may be for instance a base station of a Global System for Mobile Communications (GSM) network, of a CDMA2000 network, of a Universal Mobile Telecommunications System (UMTS) network, of a long term evolution (LTE) network, or of any other current or future kind of cellular network.

In certain embodiments, the sets of radio characteristics are provided to a server. In this case, the server may cause at least one computer to generate a radio map supporting a positioning at the site based on the received sets of radio characteristics. The at least one computer may optionally be or comprise the server. If more than one computer is caused to generate the radio map, they may be used in a cloud based computing.

Figure 3:
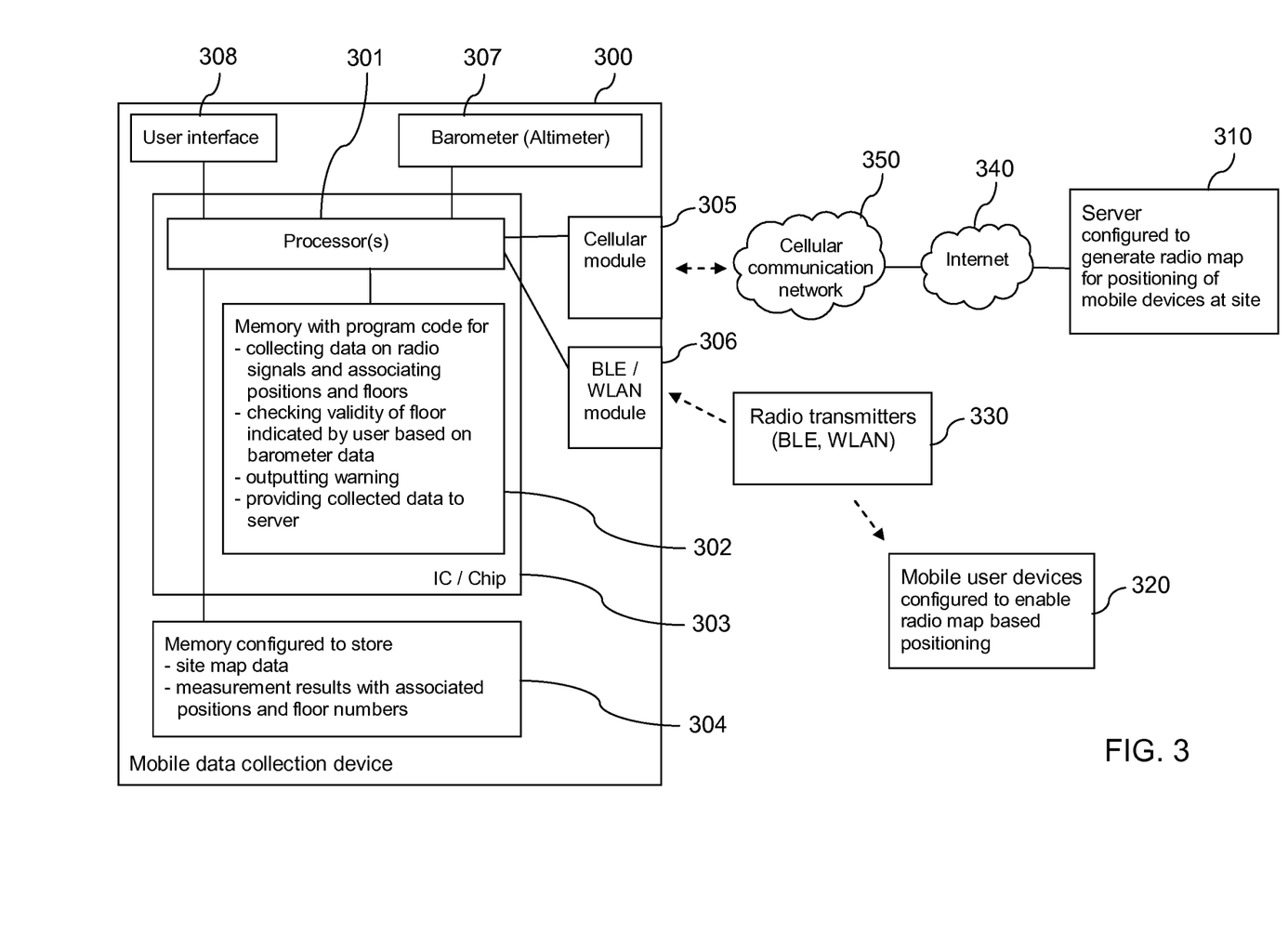
FIG. 3 is a schematic block diagram of an example embodiment of a system.

FIG. 3 is a schematic block diagram of an example embodiment of a system supporting a correct selection of floors by a user during a collection of data for the generation of at least one radio map for a site, for instance a large office building.

The system comprises a mobile data collection device 300, a server 310 and mobile user devices 320. The system further comprises a plurality of stationary radio transmitters 330. The Internet 340 may enable a connection between server 310 and other devices. A mobile communication network 350 and/or at least one WLAN may enable mobile devices 300, 320 to access the Internet 340 and thus server 310.

Mobile data collection device 300 may be for instance a regular mobile terminal, like a smartphone or general purpose tablet PC. Alternatively, it may be for instance a special survey tool. The user of mobile data collection device 300 may belong for instance to survey personnel. Mobile data collection device 300 comprises a processor 301 that is linked to a first memory 302, to a second memory 304, to a cellular communication module 305, to at least one other radio communication module 306, to a barometer or pressure altimeter 307 and to a user interface 308.

Processor 301 is configured to execute computer program code, including computer program code stored in memory 302, in order to cause mobile data collection device 300 to perform desired actions. It is to be understood that processor 301 may comprise or have access to a working memory for this purpose, for example in the form of a random access memory (not shown).

Memory 302 stores computer program code for collecting data for radio maps, computer program code for checking the validity of floors indicated by the user and for outputting a warning if needed, and computer program code for providing collected data to server 310. Memory 302 may also store any other kind of computer program code. Memory 302 may also store for instance an operating system for device 300. In addition, memory 302 may store any kind of data.

Processor 301 and memory 302 may optionally belong to a module 303, like a chip or an integrated circuit or any other kind of processing circuitry, which may comprise in addition various other components, for instance a further processor or a further memory.

Memory 304 is configured to store data of a database (DB), including site map data and measurement results. In addition, memory 304 may also store any other kind of data.

Cellular communication module 305 is configured to enable access to nodes of cellular communication network 350 and thus to enable a communication with other devices, like server 310, for instance via the Internet 340. Cellular communication module 305 may support cellular communication according to any desired mobile communication standard, like GSM, CDMA2000, UMTS, LTE, or of any other current or future standard.

The at least one other radio communication module 306 may comprise a BLE module 306 and/or a WLAN module 306. A BLE module 306 is configured to receive radio signals transmitted by BLE beacons 330. A WLAN module 306 is configured to communicate with WLAN access points 330. Alternatively or in addition to cellular communication module 305, WLAN module 306 may enable mobile data collection device 300 to access server 310 via a WLAN and further via the Internet 340.

Barometer 307 is configured to measure the atmospheric pressure. It may be configured to provide as data measured absolute values of atmospheric pressure or changes in atmospheric pressure starting from an initial atmospheric pressure at a defined starting time. In case an altimeter 307 is employed instead of a barometer, altimeter 307 may comprise a barometer providing measured atmospheric pressure internally. Altimeter 307 may be configured to process the data from the barometer and provide as data an assumed altitude based on a calibrated altitude, and/or assumed changes in altitude starting from an initial altitude at a defined starting time. For reasons of simplicity, it will be assumed in the following that a barometer 307 is used, even though a pressure altimeter 307 could be used as well.

User interface 308 may comprise for instance a touchscreen and a loudspeaker.

It is to be understood that mobile data collection device 300 may comprise various other components, like a satellite navigation system module.

Mobile data collection device 300 may constitutes an apparatus according to the invention or comprises an apparatus according to the invention, for instance in the form of module 303.

Server 310 may be for instance a dedicated location server or a general purpose server. It may be provided for a particular site or for a plurality of sites. Server 310 is configured to generate and store radio maps for a site and to support a positioning of mobile devices at the site using the generated radio maps. It is to be understood that the functions of server 310 may also be performed in the cloud in a distributed manner.

Radio transmitters 330 may, for instance, be or belong to WLAN access points of at least one WLAN and/or be or belong to BLE beacons. They may be distributed at the site such that at least one radio transmitter 330 may be observed at essentially each location of the site at which a positioning of mobile user devices 320 is to be supported. Each of radio transmitters 330 may be configured to transmit radio signals at regular intervals. These radio signals are provided to be used by mobile user devices 320 for positioning purposes. Optionally, they may be used for other purposes in addition.

Mobile user devices 320 represent devices that may desire to know their own position at the site. The position may be requested for instance by an internal application or by some other device. Any of mobile user devices 320 may be for instance a regular mobile terminal, like a smartphone or general purpose tablet PC, or it may be for instance an Internet of Things (IoT) device, like a smart watch or a smart band, etc. They are configured to perform measurements on signals transmitted by at least one type of radio transmitters 330. They are furthermore configured to compute their own position based on radio map data provided by server 310 and/or to obtain a computed position from server 310 upon request. Any of mobile user devices 320 may be configured to access server 310 for instance via a cellular communication network 350 and/or some WLAN and further via the Internet 340. It is to be understood that instead of or in addition to mobile user devices, also a positioning of other mobile devices, like autonomous mobile devices, may be supported.

Cellular communication network 350 may be of any present or future technology, like GSM, CDMA2000, UMTS or LTE.

Figure 4:
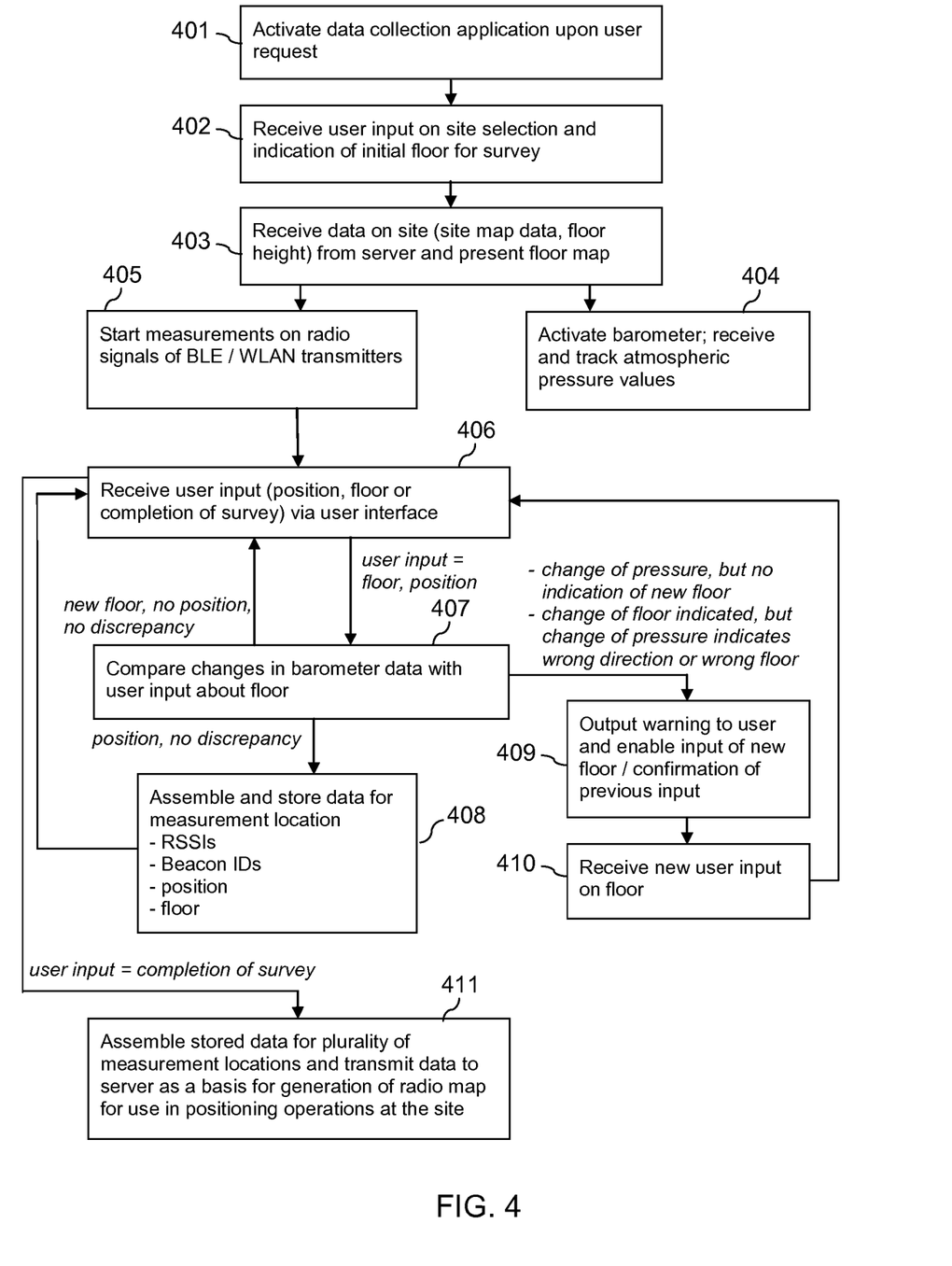
FIG. 4 is a flow chart illustrating an example embodiment of operations in the system of FIG. 3.

FIG. 4 is a flow chart illustrating example operations in the system of FIG. 3. Processor 300 and some of the program code stored in memory 300 cause mobile data collection device 300 to perform the presented actions when corresponding program code is retrieved from memory 302 and executed by processor 301.

At the site, all radio transmitters 330 regularly transmit radio signals including at least their identifier (ID). The identifier may be for instance a medium access control (MAC) address of a transmitting BLE beacon, or a basic service set identification (BSSID) of a WLAN access point in the form of a MAC address or of a random number.

In order to support a positioning of mobile user devices 320 at the site based on these radio signals, at least one radio map is to be generated for the site. The at least one radio map defines which RSS values from which radio transmitters 330 may be expected to be detected by a mobile user device 320 at each location of the site. A single three-dimensional radio map may be generated for the site, or a separate radio map may be created for each floor of the site. Mobile data collection device 300 is used to survey the site to obtain the required data for the radio map(s).

When the user of mobile data collection device 300 enters the site for the survey, the user may select an installed data collection application. In response, mobile data collection device 300 may activate the application. (action 401)

Once activated, the application may present an input mask via a touchscreen of user interface 308, which enables the user to select a site and to indicate the floor where the user is located as an initial floor for the survey. This may be the ground floor, but it could also be a basement or the top floor or any other floor at the site. Mobile data collection device 300 receives a user input with respect to site and initial floor. (action 402)

Mobile data collection device 300 retrieves map data for the indicated site from server 310. (action 403) A map of the indicated initial floor, which is based on the retrieved map data, may be presented on the touchscreen of user interface 308. The map serves for orientation and enables the user to indicate positions.

In addition, mobile data collection device 300 activates barometer 307 and starts receiving and tracking data provided by activated barometer 307. (action 404) The data provided by barometer 307 may be of different types. For instance, barometer 307 may output the currently measured atmospheric pressure. Alternatively, barometer 307 may be calibrated based on the user input of the initial floor. The data that is provided by barometer 307 may then be the difference in atmospheric pressure compared to the atmospheric pressure at the time of calibration until the next calibration takes place.

Then, mobile data collection device 300 performs measurements on radio signals using module 306 while the user of mobile data collection device 300 moves around at the site. The measurement results include in each instance the IDs of radio transmitters 330 of which radio signals are currently detected and RSS values of the detected signals. (action 405)

Mobile data collection device 300 furthermore receives a user input via user interface 308. (action 406)

The user input may include an indication of current position, identified by the user touching the corresponding location in the floor map displayed on the touchscreen. The input of a current position may be triggered for instance whenever new measurement results have been obtained in action 405. Alternatively, the user may indicate the position whenever appropriate to obtain an even distribution of indicated positions at the floor. A touched position in a floor map may be converted by mobile data collection device 300 for instance into a set of coordinates x, y of a Cartesian coordinate system for the site, or into geographic coordinates.

Alternatively, the user input may include an indication of a current floor. The user may be instructed for the survey to input an indication of the current floor at least whenever there was a change of floor and before the indication of a new position. The input of the floor may be enabled in any desired manner. For instance, there could be an indication of the previously entered floor number on the touchscreen at an edge of the presented floor map with '+' and '−' soft-buttons for changing the floor number. Indicating a new floor may result in an update of the floor map presented on the touchscreen.

For both, indication of position and of floor, a confirmation may be required by a user, for instance by pressing a displayed 'enter' button.

Alternatively to an indication of a position or a floor, the user input may be an indication of a completion of survey at the site.

When the user input includes a position or a floor, the changes in the barometer data are compared with the user input about the floor. (action 407) The comparison determines whether there is a discrepancy between changes in atmospheric pressure and the latest indication of a floor in a user input. Only rapid changes of a certain amount after the preceding user input are considered. A rapid change is a change by an amount that lies within a predetermined range and within a predetermined period of time per assumed change of floor. For instance, with a known or assumed height of floor of 3.5 meter, the change of pressure per floor may be approximately 12 Pa/m*3.5 m=42 Pa per floor, and the change for each floor should take place within a predetermined time, for instance within 30 seconds. It is to be understood that some deviations in pressure may be accepted, for example +/−50 Pa or any other values.

There may be no discrepancy, in case no user input indicating a new floor is detected and no rapid change of atmospheric pressure exceeding a predetermined value is detected; or in case there has been a user input indicating a new floor and there has been a rapid change of pressure that can be assumed to be consistent with the change of floor.

In case no discrepancy is detected in action 407 and the user input received in action 406 was an indication of a position, mobile data collection device 300 assembles and stores data for a particular location of measurement. (action 408) The particular location of measurement may be the location of the latest measurements so that the indicated position may be assumed to correspond to the location of measurement. It is to be understood that alternatively, measurements on radio signals may only be carried out whenever an indication of a position in a user input is detected in action 406 and that this defines the particular location of measurement. The assembled data comprises a set of characteristics of radio signals including detected radio transmitter IDs and for each radio transmitter an RSSI corresponding to the received signal strength at the particular location of measurement. The assembled data comprise, associated with this set of characteristics, the position indicated by the user and optionally the latest floor indicated by the user. The assembled data may be stored in memory 304. A database making use of memory 304 may be structured such that assembled data may be stored separately for each floor. In this case, it may not be needed to associate an identified floor with each set of assembled data; instead, the assembled data may be stored in an area provided for the identified floor. Additional information, like timestamps may be included as well in the assembled data.

In case no discrepancy is detected in action 407 and the user input received in action 406 was an indication of a new floor, the operation continues with action 406, and mobile data collection device 300 waits for the next user input.

When the comparison in action 407 shows a discrepancy between changes of atmospheric pressure and the latest indicated floor, a warning is output to the user and a user input is requested. (action 409) The warning may be output for instance via a loudspeaker of user interface 308; or it may be output via the touchscreen of user interface 308. In the latter case, a user input may be requested on a screen that is colored in red as a warning, for example.

A discrepancy may be detected in action 407, in case a user input in action 406 indicates a higher floor than before, but a detected rapid increase in atmospheric pressure indicates a lower floor, or vice versa. To provide an example, a user may be collecting radio data on the second floor. Then the user changes to the first floor. Accordingly, tracked changes in atmospheric pressure show that the user has moved downwards by several meters. However, the user re-engages in the collection of radio data indicating, as a first step, by mistake the third floor in action 406. To avoid that the user starts collecting data for the third floor even though he can be assumed to be located on the first floor, a warning is given and the user is enabled to indicate a new floor. Similarly, for instance, a user may be collecting radio data on the second floor. Then the user changes to the third floor. Accordingly, tracked changes in pressure show that the user has moved upwards by several meters. However, the user re-engages in the collection of radio data indicating, as a first step, by mistake the first floor in action 406. To avoid that the user starts collecting data for the first floor even though he can be assumed to be located on the third floor, a warning is given and the user is enabled to indicate a new floor.

A discrepancy may furthermore be detected in action 407, in case a user input indicates a change of floor by a first number of floors, but a detected rapid change in atmospheric pressure indicates a change of floor by another, second number of floors. To provide an example, a user may be collecting radio data on the first floor. Then, the user changes floor. Tracked changes in atmospheric pressure show that the user can be assumed to have moved upwards by 8 meters. However, the user re-engages in the data collecting indicating, as a first step, the second floor as new floor. This is not plausible, however, if the average floor height is known or assumed to be 3.5 meters. Rather, it may be assumed that the user probably moved two floors upwards to the third floor, not only one floor to the second floor. To avoid that the user starts collecting data for the wrong floor, a warning is given and the user is enabled to indicate a new floor or to confirm the previously indicated floor. Obviously, it is possible that a building has high floors so that the final decision may be left to the user.

A discrepancy may furthermore be detected in action 407, in case there has been a rapid change of atmospheric pressure since the second but last user input but no indication of a new floor by the user in the last input in action 406. To provide an example, a user may be collecting radio data on floor N and then change to floor M to continue collection of radio data on the next floor. The tracked changes in the atmospheric pressure may clearly indicate the floor change. However, the user may have forgotten to indicate a floor change and to switch the floor plan in action 406. Instead, the first user input in action 406 after the change of floor may have been a position. To avoid that the user continues collecting data for floor N, a warning is given and the user is enabled to indicate a new floor.

A discrepancy may furthermore be detected in action 407, in case a change of floor has been indicated in the last user input in action 406, but no rapid change of pressure has been detected. To provide an example, a user may have erroneously entered an indication of a new floor in action 406, even though the user is still in the process of collecting data on the previously indicated floor. To avoid that the user starts collecting data for a new floor, a warning is given and the user is enabled to indicate the correct floor.

Enabling a user to confirm a previously indicated floor instead of inputting a new floor may generally be an option, or only in case a rapid change of pressure indicates a change of height in the correct direction, but to an amount that seems not to be in line with the new number of floor indicated by the user.

Mobile data collection device 300 receives an indication of a new floor input by a user upon the warning (or a confirmation of the previously indicated floor) and assumes that the indication of a floor is now correct. (action 410)

The operation continuous with action 406 to enable the user to indicate positions for the current floor.

In case barometer 307 outputs changes of atmospheric pressure compared to a certain starting time, barometer 307 may be reset after each input of a new floor as well as after each assembly of data without change of floor. The latter may reduce the effect of slow changes in pressure due to weather fronts. Of course, a corresponding reset could also be applied by processor 301 executing suitable program instructions to tracked changes in atmospheric pressure, in case barometer 307 is configured to generally output the currently measured absolute atmospheric pressure as barometer data. Alternatively or in addition, a reset may be carried out at regular time intervals of predefined duration, and in case a pressure change (or a corresponding altitude change) during the last time period is below predetermined threshold.

When the user input received in action 406 is detected to be an indication of a completion of survey, mobile data collection device 300 retrieves the stored data for the site from memory 304 and transmits the assembled data for the site to server 310.

Server 310 receives the assembled data as a basis for generating a radio map for use in positioning operations at the site. Server 310 may generate for instance a grid based radio map for each radio transmitter 330 for which RSSIs have been received. Each grid is defined to cover the site such that each grid point corresponds to a geographical location at the site. If the site comprises several floors, a separate grid may be defined for each floor, or a single three-dimensional grid may be defined, with one dimension for the floors. Each grid based radio map may be generated by mapping the RSSI for a respective radio transmitter ID to the grid point that corresponds to a geographical location that is closest to the position (and floor) associated with the set of characteristics comprising the RSSI. If there are several RSSIs for the radio transmitter 330 that would be mapped to the same grid pint, some kind of average value may be used, for instance the arithmetic mean or the median value. For grid points to which no RSSIs could be mapped due to missing data from the corresponding areas at the site, RSSIs may be generated by interpolating surrounding RSSIs if possible, and by extrapolating neighboring RSSIs otherwise. Server 310 stores the grid based radio map data.

The data may then be used for positioning mobile user devices 320. A mobile user device 320 may perform measurements on radio signals at a certain location at the site. The result of measurements may include an identifier of all radio transmitters 330 of which radio signals are detected at the location, and an RSSI indicating the signal strength of the respectively detected radio signal. Mobile user device 320 may send a request to server 310. If the request includes a positioning request comprising measurement results, server 310 may perform the required positioning computations. To this end, it may determine the location at the site, at which expected RSSIs for all radio transmitters 330 at the site fit best to the provided RSSIs. This location may then be provided as estimated position to mobile user device 330. Alternatively, mobile user device 320 may request and receive the radio map data for the site and take care of the positioning computations itself.

It is to be understood that the presented example systems, apparatuses and operations may be varied in many ways. The systems and apparatuses may be varied for instance by modifying, adding or omitting components. The operations may be varied for instance by modifying actions, by omitting actions and/or by adding actions. In addition, the order of actions may be modified.

For example, in an alternative embodiment, the radio transmitters 330 may include other transmitters than BLE beacons or WLAN access points, for example regular Bluetooth transmitters or ultra-sound transmitters, etc.

For example, in an alternative embodiment of the operation of FIG. 4, a pressure altimeter 307 is configured to convert the atmospheric pressure measured by a barometer of the altimeter 307 into an absolute or relative altitude. For an absolute altitude, the altitude of the initial floor may be input in addition by the user, e.g. based on the information on the site received from server 310, or it may be set to zero at the initial floor. Processor 301 may then receive and track changes in altitude, and compare these changes in altitude, instead of changes in atmospheric pressure, with the floors indicated by a user, in actions 404 and 407.

Summarized, certain embodiments of the invention may contribute to ensuring that only sets of characteristics that are associated with the correct floor are provided for generating a radio map. This may ensure that the number of additional surveys at a site may be reduced and that a processing load that is due to required new generations of radio maps is reduced.

Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processor(s) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

A bus may be provided for connecting processor(s) and memories.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

In example embodiments, any non-transitory computer readable medium mentioned in this text could also be a removable/portable storage or a part of a removable/portable storage instead of an integrated storage. Example embodiments of such a removable storage comprise a magnetic disc storage, of an optical disc storage, a semiconductor memory circuit device storage and of a Micro-SD semiconductor memory card storage.

The functions illustrated by processor 101 in combination with memory 102, or processor 301 in combination with memory 302, or component 303 can also be viewed as means for collecting data, which enables a generation of at least one radio map for a site, the collection of data comprising: detecting at least one indication of a floor, at which a user is located at the site, in a user input to a mobile device, and performing measurements on radio signals to obtain for each of a plurality of locations of the site a set of characteristics of radio signals transmitted by terrestrial radio transmitters; means for receiving, during the collection of data, data from a barometer or pressure altimeter of the mobile device, verifying a most recent indication of a floor in a user input based on changes in the data from the barometer or pressure altimeter, and outputting a warning to the user in the case of a discrepancy; means for associating each set of characteristics with a floor, the floor being based on a most recent indication of a floor at a time when the respective set of characteristics has been obtained; and means for providing the sets of characteristics and their association with a floor for a generation of at least one radio map supporting a positioning of mobile devices at the site.

The program codes in memory 102 and memory 302 can also be viewed as comprising such means in the form of functional modules.

FIGS. 2 and 4 may also be understood to represent example functional blocks of computer program codes supporting a selection of floors.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

What is claimed is:

1. A method performed by a mobile device, the method comprising:
   collecting data, which enables a generation of at least one radio map for a site, the collection of data comprising:
      detecting at least one indication of a floor, at which a user is located at the site, in a user input to the mobile device; and
      performing measurements on radio signals to obtain for each of a plurality of locations of the site a set of characteristics of radio signals transmitted by terrestrial radio transmitters;
   receiving, during the collection of data, data from a barometer or pressure altimeter of the mobile device, and verifying a most recent indication of a floor in a user input based on changes in the data from the barometer or pressure altimeter, wherein verifying the most recent indication of a floor comprises using at least one of (a) a change of barometer data or pressure altimeter data during a time interval between the two latest user inputs is used for the verification of the most recent indication of a floor or (b) a cumulative altitude change, which is determined based on changes in barometer data or pressure altimeter data during a time interval between the two latest user inputs;

associating each set of characteristics with a floor, the floor being based on a most recent indication of a floor at a time when the respective set of characteristics has been obtained; and providing the sets of characteristics and their association with a floor for a generation of at least one radio map supporting a positioning of mobile devices at the site.

2. The method according to claim 1, further comprising:

detecting at each of the plurality of locations an indication of a position in a user input to the mobile device;

associating in addition a position with each set of characteristics, the position being based on the indication of the position at the location for which the respective set of characteristics has been obtained; and providing the sets of characteristics with respectively associated floor and position for a generation of at least one radio map supporting a positioning of mobile devices at the site.

3. The method according to claim 1, wherein one of:

a change in barometer data or pressure altimeter data is considered to reflect a change of floor, if and only if the change is of a predetermined amount during a predetermined time; or a change in barometer data or pressure altimeter data is considered to reflect a change of altitude, if and only if the change in barometer data or pressure altimeter data is of a predetermined amount during a predetermined time, and wherein the change of altitude is used to verify the most recent indication of a floor in a user input.

4. The method according to claim 1, further comprising, responsive to identifying a discrepancy between the most recent indication of a floor and the at least one of fa) a change of barometer data or pressure altimeter data during a time interval between the two latest user inputs is used for the verification of the most recent indication of a floor; or (b) a cumulative altitude change, which is determined based on changes in barometer data or pressure altimeter data during a time interval between the two latest user inputs, outputting a warning to the user.

5. The method according to claim 1, further comprising in the case a warning is output to the user:

requesting the user to confirm the indicated floor or to input a corrected floor; and/or suspending an association of a floor with sets of characteristics until a new user input indicating a new floor or confirming the previously indicated floor is detected.

6. The method according to claim 1, wherein data received from the barometer indicates information on atmospheric pressure; and/or wherein data received from the pressure altimeter indicates information on an altitude.

7. The method according to claim 1, further taking account of the following for the verification:

a known floor height at the site; or a floor height within a predetermined range.

8. The method according to claim 1, wherein the radio transmitters comprise wireless local area network access points; and/or Bluetooth beacons; and/or Bluetooth Low Energy beacons.

9. The method according to claim 1, wherein sets of radio characteristics are provided to a server, the server causing at least one computer to generate a radio map supporting a positioning at the site based on the received sets of radio characteristics.

10. An apparatus comprising at least one processor and at least one memory, wherein the at least one memory includes computer program code, the at least one memory and the computer program code configured to, with the at least one processor, cause a mobile device at least to:

collect data, which enables a generation of at least one radio map for a site, the collection of data comprising:

detect at least one indication of a floor, at which a user is located at the site, in a user input to the mobile device; and perform measurements on radio signals to obtain for each of a plurality of locations of the site a set of characteristics of radio signals transmitted by terrestrial radio transmitters;

receive, during the collection of data, data from a barometer or pressure altimeter of the mobile device, and verify a most recent indication of a floor in a user input based on changes in the data from the barometer or pressure altimeter, wherein verifying the most recent indication of a floor comprises using at least one of (a) a change of barometer data or pressure altimeter data during a time interval between the two latest user inputs is used for the verification of the most recent indication of a floor or (b) a cumulative altitude change, which is determined based on changes in barometer data or pressure altimeter data during a time interval between the two latest user inputs;

associate each set of characteristics with a floor, the floor being based on a most recent indication of a floor at a time when the respective set of characteristics has been obtained; and provide the sets of characteristics and their association with a floor for a generation of at least one radio map supporting a positioning of mobile devices at the site.

11. The apparatus according to claim 10, wherein the at least one memory and the computer program code are further configured to, with the at least one processor, cause the mobile device to:

detect at each of the plurality of locations an indication of a position in a user input to the mobile device;

associate in addition a position with each set of characteristics, the position being based on the indication of the position at the location for which the respective set of characteristics has been obtained; and provide the sets of characteristics with respectively associated floor and position for a generation of at least one radio map supporting a positioning of mobile devices at the site.

12. The apparatus according to claim 10, wherein one of a change in barometer data or pressure altimeter data is considered to reflect a change of floor, if and only if the change is of a predetermined amount during a predetermined time; or a change in barometer data or pressure altimeter data is considered to reflect a change of altitude, if and only if the change in barometer data or pressure altimeter data is of a predetermined amount during a predetermined time, and wherein the change of altitude is used to verify the most recent indication of a floor in a user input.

13. The apparatus according to claim 10, further comprising, responsive to identifying a discrepancy between the most recent indication of a floor and the at least wherein one of (a) a change of barometer data or pressure altimeter data during a time interval between the two latest user inputs is used for the verification of the most recent indication of a floor; or (b) a cumulative altitude change, which is determined based on changes in barometer data or pressure altimeter data during a time interval between the two latest user inputs, outputting a warning to the user.

14. The apparatus according to claim 10, wherein the at least one memory and the computer program code are further configured to, with the at least one processor, cause the mobile device to perform the following in the case a warning is output to the user:
request the user to confirm the indicated floor or to input a corrected floor; and/or
suspend an association of a floor with sets of characteristics until a new user input indicating a new floor or confirming the previously indicated floor is detected.

15. The apparatus according to claim 10, wherein data received from the barometer indicates information on atmospheric pressure; and/or
wherein data received from the pressure altimeter indicates information on an altitude.

16. The apparatus according to claim 10, wherein the at least one memory and the computer program code are further configured to, with the at least one processor, cause the mobile device to take account of the following for the verification:
a known floor height at the site; or
a floor height within a predetermined range.

17. The apparatus according to claim 10, wherein the radio transmitters comprise wireless local area network access points; and/or
Bluetooth beacons; and/or
Bluetooth Low Energy beacons.

18. The apparatus according to claim 10, wherein the apparatus is:
a mobile device; or
a mobile communication device; or
a module for a mobile device.

19. A system comprising an apparatus according to claim 10 and a server configured to receive sets of characteristics provided by the apparatus for a site and to cause a generation of at least one radio map for the site based on received sets of characteristics.

20. A non-transitory computer readable storage medium in which computer program code is stored, the computer program code causing a mobile device to perform the following when executed by at least one processor:
collect data, which enables a generation of at least one radio map for a site, the collection of data comprising:
detect at least one indication of a floor, at which a user is located at the site, in a user input to the mobile device; and
perform measurements on radio signals to obtain for each of a plurality of locations of the site a set of characteristics of radio signals transmitted by terrestrial radio transmitters;
receive, during the collection of data, data from a barometer or pressure altimeter of the mobile device, and verify a most recent indication of a floor in a user input based on changes in the data from the barometer or pressure altimeter, wherein verifying the most recent indication of a floor comprises using at least one of (a) a change of barometer data or pressure altimeter data during a time interval between the two latest user inputs is used for the verification of the most recent indication of a floor or (b) a cumulative altitude change, which is determined based on changes in barometer data or pressure altimeter data during a time interval between the two latest user inputs;
associate each set of characteristics with a floor, the floor being based on a most recent indication of a floor at a time when the respective set of characteristics has been obtained; and
provide the sets of characteristics and their association with a floor for a generation of at least one radio map supporting a positioning of mobile devices at the site.

* * * * *

UNITED STATES PATENT AND TRADEMARK OFFICE
CERTIFICATE OF CORRECTION

| | |
|---|---|
| PATENT NO. | : 11,156,694 B2 |
| APPLICATION NO. | : 16/769194 |
| DATED | : October 26, 2021 |
| INVENTOR(S) | : Ivanov et al. |

It is certified that error appears in the above-identified patent and that said Letters Patent is hereby corrected as shown below:

In the Claims

Column 17,
Line 37, "fa)" should read --(a)--.

Column 18,
Line 66, "the at least wherein one" should read --the at least one--.

Signed and Sealed this
Fourth Day of October, 2022

Katherine Kelly Vidal
*Director of the United States Patent and Trademark Office*